United States Patent [19]
Herzl et al.

[11] Patent Number: 5,361,368
[45] Date of Patent: Nov. 1, 1994

[54] CROSS INTERROGATE SYNCHRONIZATION MECHANISM INCLUDING LOGIC MEANS AND DELAY REGISTER

[75] Inventors: Robert D. Herzl, Lake Katrine; Linda L. Quinn, Red Hook; Russell E. Schroter, Kingston, all of N.Y.

[73] Assignee: International Business Machines Corporation, Armonk, N.Y.

[21] Appl. No.: 755,236

[22] Filed: Sep. 5, 1991

[51] Int. Cl.⁵ .................. G06F 13/40; G06F 13/18
[52] U.S. Cl. .................. 395/800; 395/200; 395/250; 364/131; 364/134; 364/239.6; 364/239.8; 364/DIG. 1; 364/DIG. 2
[58] Field of Search .............. 395/800, 275, 250, 425, 395/200; 364/DIG. 1, DIG. 2, 131, 134, 239.6, 239.8

[56] References Cited

U.S. PATENT DOCUMENTS

| | | | |
|---|---|---|---|
| 4,136,386 | 1/1979 | Annunziata et al. | 395/425 |
| 4,394,731 | 7/1983 | Flusche et al. | 395/425 |
| 4,654,778 | 3/1987 | Chiesa et al. | 395/425 |
| 4,905,141 | 2/1990 | Brenza | 395/425 |
| 5,023,776 | 6/1991 | Gregor | 395/425 |
| 5,032,985 | 7/1991 | Currance et al. | 395/650 |
| 5,130,922 | 7/1992 | Lui | 395/200 |
| 5,197,139 | 3/1993 | Emma et al. | 395/400 |

FOREIGN PATENT DOCUMENTS 343989 11/1989 European Pat. Off. .

Primary Examiner—Alyssa H. Bowler
Assistant Examiner—Dzung C. Nguyen
Attorney, Agent, or Firm—Lynn L. Augspurger

[57] ABSTRACT

A mechanism prioritizes cross interrogate requests between multiple requestors in a multi-processor system where the delay due to cable length interconnecting requestors results in requests not being received within one machine cycle. Local and remote cross interrogate (XI) requests are latched up in storage control element (SCE) temporary registers before being prioritized. The local request is staged in a local delay register. The local request is selected from the local delay register by synchronization control logic, instead of the temporary register, when the remote request is issued one cycle earlier than the local request, or when both local and remote requests are issued at the same time, but the remote requests is from a master SCE. The staging of the local requests can be extended to multiple cycles, corresponding to the length of the cables between SCEs.

6 Claims, 5 Drawing Sheets

CROSS INTERROGATE SYNCHRONIZATION MECHANISM INCLUDING LOGIC MEANS AND DELAY REGISTER

BACKGROUND OF THE INVENTION

1. Field of the Invention

The present invention generally relates to multi-processor (MP) data processing systems where each processor processes cross interrogate (XI) request from other processors and, more particularly, to an efficient mechanism for the prioritization of cross interrogate requests between multiple requestors where the delay due to cable length interconnecting requestors results in requests not being received within one machine cycle.

2. Description of the Prior Art

High performance, multi-processor (MP) computer systems are being developed to increase throughput by performing in parallel those operations which can run concurrently on separate processors. Such high performance, MP computer systems are characterized by multiple central processors (CPs) operating independently and in parallel, but occasionally communicating with one another or with a main storage (MS) when data needs to be exchanged. The CPs and the MS have input/output (I/O) ports which must be connected to exchange data.

In the type of MP system known as the tightly coupled multi-processor system in which each of the CPs have their own caches, there exist coherence problems at various levels of the system. More specifically, inconsistencies can occur between adjacent levels of a memory hierarchy. The multiple caches could, for example, possess different versions of the same data because one of the CPs has modified its copy. It is therefore necessary for each processor's cache to known what has happened to lines that may be in several caches at the same time. In a MP system where there are many CPs sharing the same main storage, each CP is required to obtain the most recently updated version of data according to architecture specifications when access is issued. This requirement necessitates constant monitoring of data consistency among caches.

A number of solutions have been proposed to the cache coherence problem. Early solutions are described by C. K. Tang in "Cache System Design in the Tightly Coupled Multiprocessor System", *Proceedings of the AFIPS* (1976), and L. M. Censier and P. Feautrier in "A New Solution to Coherence Problems in Multicache Systems", *IEEE Transactions on Computers,* Dec. 1978, pp. 1112 to 1118. Censier et al. describe a scheme allowing shared writable data to exist in multiple caches which uses a centralized global access authorization table. However, as the authors acknowledge in their Conclusion section, they were not aware of similar approaches as described by Tang two years earlier. While Tang proposed using copy directories of caches to maintain status, Censier et al. proposed to tag each memory block with similar status bits.

These early approaches resolve around how to do bookkeeping in order to achieve cross-interrogates (XI) when needed. The idea was to record at the global directory (copies of memory tags) information about which processor caches owns a copy of a line, and which one of the caches has modified its line. The basic operation is to have the global table record (with a MODIFIED bit) status when a processor stores into a line. Since store-in caches are used, the processor cache controller knows, from its cache directory, which lines are modified or private. A store into a non-modified line at a processor will necessitate synchronization with the storage controller and obtaining the MODIFIED status first. Therefore, a storage block cannot be exclusive, or modifiable, for a processor unless the processor has actually issued a store into it, even when the cache has the only copy of the line in the system.

The EX status in a more general sense, as described in U.S. Pat. No. 4,394,731 to Flusche et al., can allow a processor to store into the cache without talking to the storage control element (SCE), even when the line was never stored into the cache. This is a subtle difference but is rather important from a conceptual point of view, since it allows, for example, in an IBM/3081 system, acquiring EX status of a line at a processor when a subsequent store is "likely" to come.

There are various types of caches in prior art MP systems. One type of cache is the store through (ST) cache as described in U.S. Pat. No. 4,142,234 to Bean et al. for the IBM System/370 Model 3033 MP. ST cache design does not interfere with the CP storing data directly to the main storage (or second level cache) in order to always update changes of data to main storage. Upon the update of a store through to main storage, appropriate cross-interrogate (XI) actions may take place to invalidate possible remote copies of the stored cache line. The storage control element (SCE) maintains proper storage stacks to queue the main storage (MS) store requests and standard communication between buffer control element (BCE) and SCE will avoid store stack overflow conditions. When the SCE store stack becomes full, the associated BCE will hold its MS stores until the condition is cleared.

Another type of cache design is the store-in cache (SIC) as described, for example, in U.S. Pat. No. 3,735,360 to Anderson et al. and U.S. Pat. No. 4,771,137 to Warner et al. A SIC cache directory is described in detail in the aforementioned U.S. Pat. No. 4,394,731 to Flusche et al. in which each line in a store-in cache has its multi-processor shareability controlled by an exclusive/read only (EX/RO) flag bit. The main difference between ST and SIC cache is that, all stores in SIC are directed to the cache itself (which may cause a cache miss if the stored line is not in the SIC cache). It is also proposed in U.S. Pat. No. 4,503,497 that data transfer upon a miss fetch can take place through a cache-to-cache transfer (CTC) bus if a copy is in the remote cache. A SCE is used that contains copies of the directories in each cache. This permits cross-interrogate (XI) decisions to be resolved at the SCE. Usually, cache line modifications are updated to main storage only when the lines are replaced from the cache.

In very large multi-processor (MP) systems, multiple SCEs are used, and these SCEs must communicate with one another. Where the physical connection between SCEs is long, a problem occurs in prioritization of the XI requests. The cables between the SCEs in prior machines have been short enough that the XI requests issued by one SCE reached another SCE in the same machine cycle. However, when the connection between the processors results in a delay that is longer than one machine cycle, the delay caused by the cable length will cause local and remote requests to be processed out of time sequence. For such large machines, what is needed is a mechanism for prioritization of cross interrogate requests to maintain proper time sequence of the requests.

SUMMARY OF THE INVENTION

It is therefore an object of the present invention to provide an efficient mechanism for the prioritization of cross interrogate requests between multiple requests where the delay due to cable length interconnecting requestors results in requests not being received within one machine cycle.

According to the invention, local and remote cross interrogate (XI) requests are latched up in SCE temporary registers before being prioritized. The local request is staged in a local delay register. The local request is selected from the local delay register by synchronization control logic, instead of the temporary register, when the remote request is issued one cycle earlier than the local request, or when both local and remote requests are issued at the same time, but the remote request is from the master SCE. The staging of the local requests can be extended to multiple cycles, corresponding to the length of the cables between SCEs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
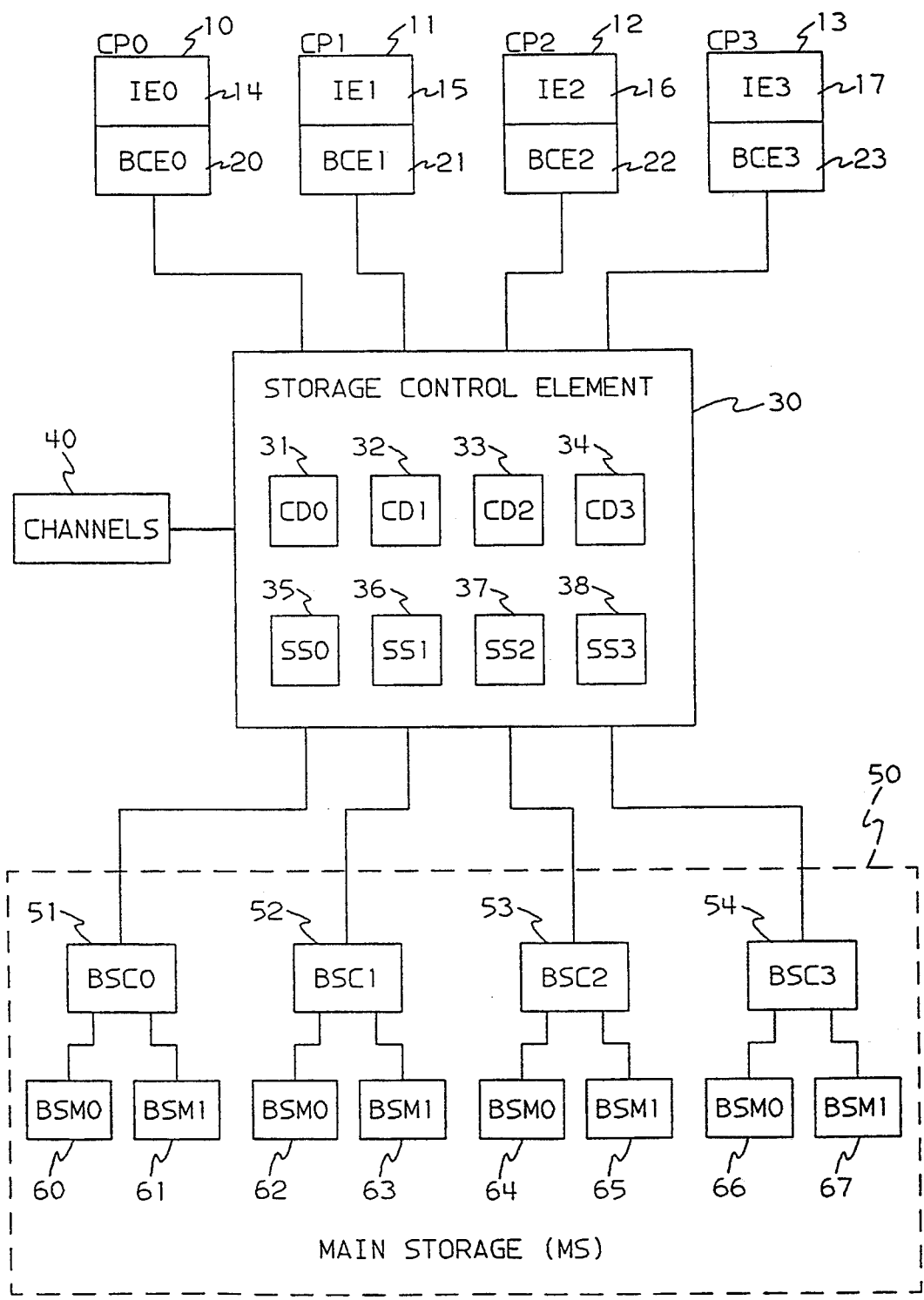
FIG. 1 is a block diagram of a typical multi-processing system illustrating the operation of a storage control element.

Referring now to the drawings, and more particularly to FIG. 1, there is illustrated in block diagram from a multi-processor (MP) system of the type in which the invention may be used. The mP system comprises four central processors ($CP_0$, $CP_1$, $CP_2$, and $CP_3$) 10, 11, 12, and 13 in which each CP includes an instruction execution (IE) unit 14, 15, 16, and 17 and buffer control unit (BCE) 20, 21, 22, and 23, respectively. Each IE unit includes hardware and microcode that issue instructions that require the fetching and storing of operands in main storage (MS) 50.

The IE units 14 to 17 begin a fetching or storing operation by issuing a fetch or store command to their respective cache control BCEs 20 to 23, which include a processor store-in cache (SIC) with its associated processor cache directory (PD) and all processor cache controls which are exclusively used by their associated CPs 10 to 13. The CP generally issues a fetch or store command for each doublewords (DW) unit required by an operand. If the cache line containing the DW is in the PD, which is a cache hit, the DW is fetched or stored in the cache in accordance with the command. For an operand fetch hit in cache, the storage access is completed without any need to go outside of the BCE. Occasionally, the required DW is not in the cache, which results in a cache miss. Before the IE fetch or store command can be completed, the DW must be fetched from the main storage. To do this, the BCE generates a corresponding fetch or store miss command which requests the storage control element (SCE) 30 to obtain from main storage 50 a line unit of data having the DW required by the IE unit. The line unit will be located in the main storage 50 on a line boundary, but the required DW will be the first DW in the fetched line to be returned to the requesting BCE in order to keep the IE request going before the completion of the missed line transfer.

SCE 30 connects to the CPs 10 to 13 and main storage 50. Main storage 50 is comprised of a plurality of basic storage module (BSM) controllers $BSC_0$, $BSC_1$, $BSC_2$, and $BSC_3$ (51, 52, 53, and 54, respectively) in which each basic storage controller connects to two BSMs 0 (60, 62, 64, and 66) and 1 (61, 63, 65, and 67). The four BSCs 51 to 54 are each connected to the SCE 30.

In prior systems, the SCE 30 contains four copy directories (CDs) 31, 32, 33, and 34, each containing an image of the contents of a corresponding processor cache directory (PD) in one of the BCEs in a manner similar to that described in U.S. Pat. No. 4,394,731 to Flusche et al. A doubleword wide bidirectional data bas is provided between each BSM 60 to 67 in main storage and corresponding SCE port, and from SCE ports to I/O channel processor 40 and each of the corresponding CPs 10 to 13. Along with the data busses for control and address signals. When a CP encounters a cache miss for a DW access request, its BCE initiates a line access request to main storage by sending a miss command to SCE 30, which then reissues the command to a required BSM in main storage. In the event of a BSM busy condition, SCE 30 will save the request in a command queue and will reissue it at a later time when the required BSM 60 to 67 becomes available. SCE 30 also sequences the main storage commands in an orderly fashion so that all commands to a particular BSM are issued in first-in, first-out (FIFO) order, except when a cache conflict is found bit its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20 to 23 to be received by SCE 30.

SCE 30 maintains a plurality of store stacks ($SS_0$, $SS_1$, $SS_2$, and $SS_3$) 35, 36, 37, and 38, each for holding of main storage store requests of up to 16 DWs for a corresponding CP. SCE 30 keeps enough directory information for the store stacks for the indication of main storage addresses and validity. When a store stack risks overflow, SCE 30 sends a priority request to the associated BCE 20 to 23 to hold the sending of more store requests until the BCE receives a later signal from SCE 30 clearing the store stack full condition. Data in the store stacks are updated to main storage with appropriate scheduling maintaining the incoming order within each store stack. A line fetch request from a CP is held by SCE 30 until the SCE makes sure that all existing stores to the line in the store stacks have been sent to the associated BSM 60 to 67.

As will become clear from the following description, the subject invention is concerned with multi-processor (MP) data processing systems which have more than one SCE. In such systems, the SCE's communicate with one another via physical cables interconnecting units. In prior systems of this type, the cables have been physically short enough to allow communication between SCEs within a single machine cycle. In a specific environment in which the invention has been implemented, the cable lengths are approximately three meters due to the packaging of the system. Such long cables effectively "store" requests for a machine cycle; that is, the propagation delay over the cables is more than one machine cycle.

Figure 2:
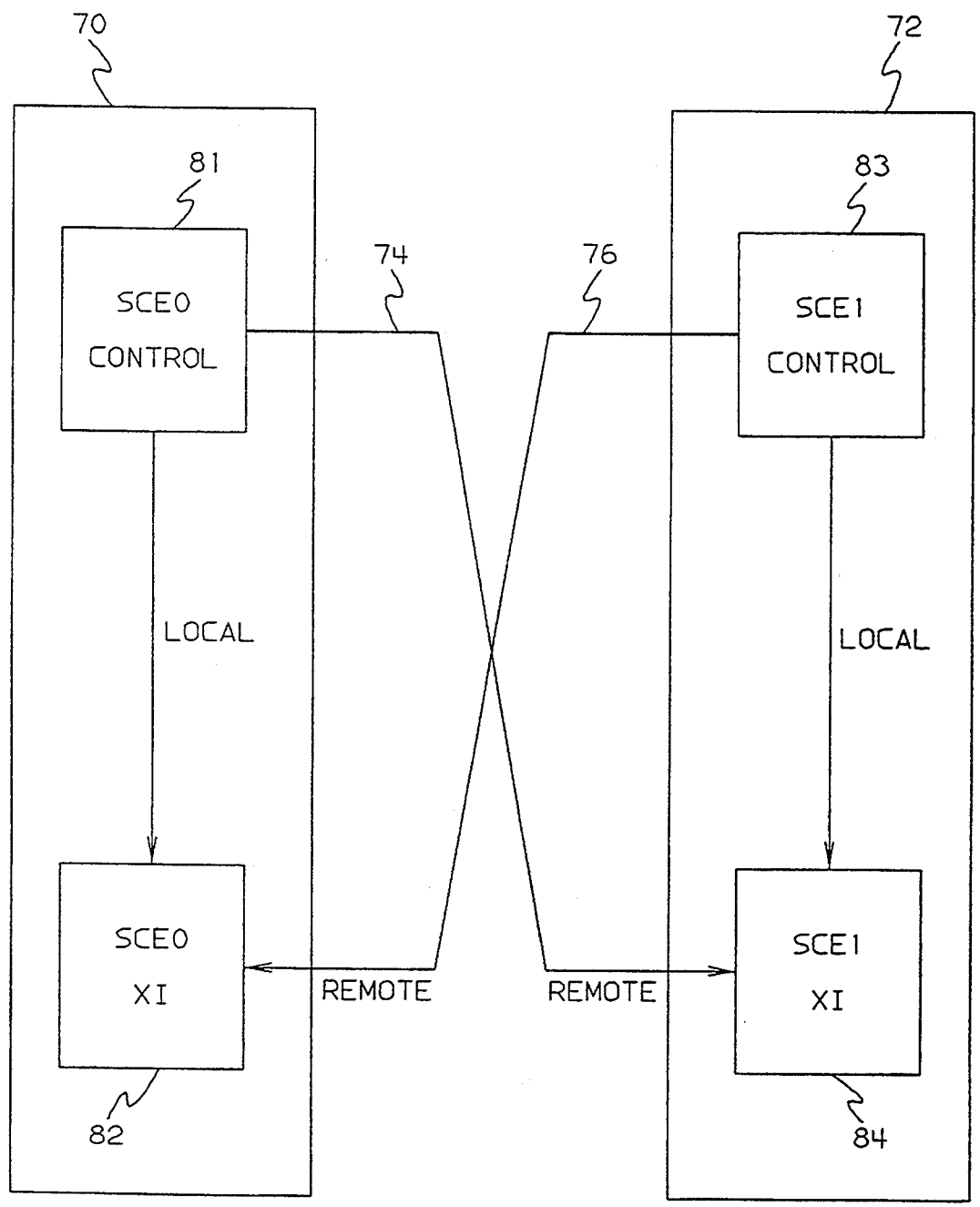
FIG. 2 is a high level block diagram showing two storage control elements in a multi-processing system.

FIG. 2 shows such a multi-processor (MP) environment in which the invention is implemented. Two multi-processor (MP) systems 70 and 72 are interconnected by cables 74 and 76. The storage control element (SCE) in MP 70 is shown as comprising two parts; an SCE0 control 81 and an SCE0 XI 82. Likewise, the SCE in MP 72 comprises two parts; an SCE1 control 83 and an SCE1 XI 84. In the notation adopted, SCE0 designates the "master" SCE among a plurality of SCEs in an MP system. The master SCE is given priority by the logic implemented in the preferred embodiment of the invention.

The cables 74 and 76 respectively interconnect SCE0 control 81 and SCE1 XI 84 and SCE1 control 83 and SCE0 XI 82. The cables 74 and 76 between the SCEs are long enough so that XI requests issued by one SCE, say SCE0 81, to the other SCE1 84 are "stored" on the cable for one machine cycle, reaching the SCE1 84 a cycle later. Because of this, an XI synchronization mechanism is needed to establish cross interrogate prioritization.

Figure 3:
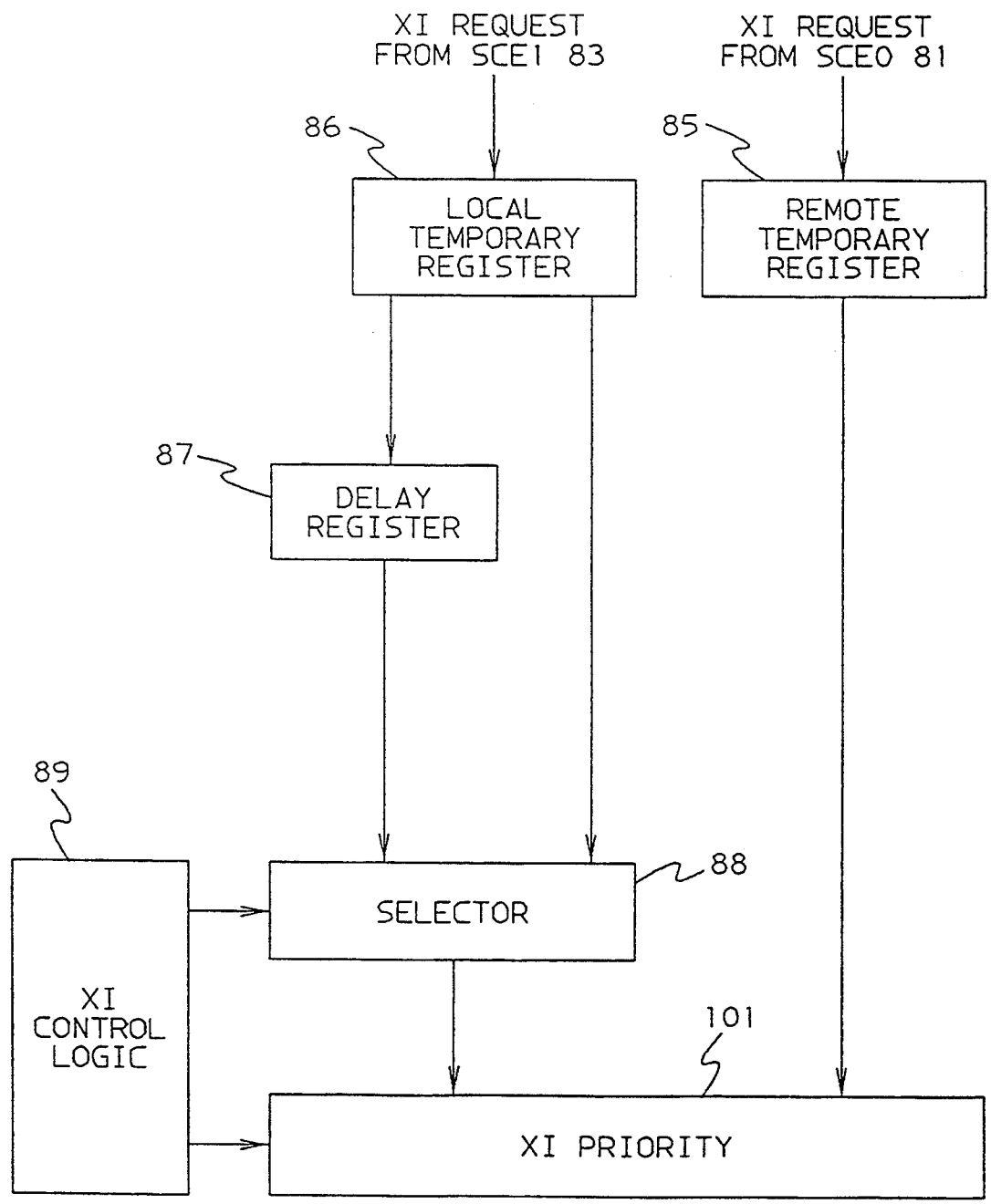
FIG. 3 is a block diagram of the cross interrogate synchronization logic for one of the storage control elements according to the invention.

Both local and remote XI requests are latched in SCE temporary registers before being prioritized. This is shown in FIG. 3 for SCE1 84, and it will be understood that similar logic is implemented in SCE0 82. More particularly with reference to FIG. 3, a remote XI request from SCE0 81 is latched in a remote temporary register 85, while a local XI request from SCE1 83 is latched in a local temporary register 86. The local request is staged one cycle in a local delay register 86 and the local delay register are selected by selector 88 under the control of the XI control logic 89.

There are two situations where the local request is selected from the delay register 87, instead of the temporary register 86. The synchronization control logic 89 selects the local delay register 87 when the remote request is issued one cycle earlier than the local request. It also selects the local delay register 87 when both local and remote requests are issued at the same time, but the remote request is from the master SCE0 81.

Figure 5:
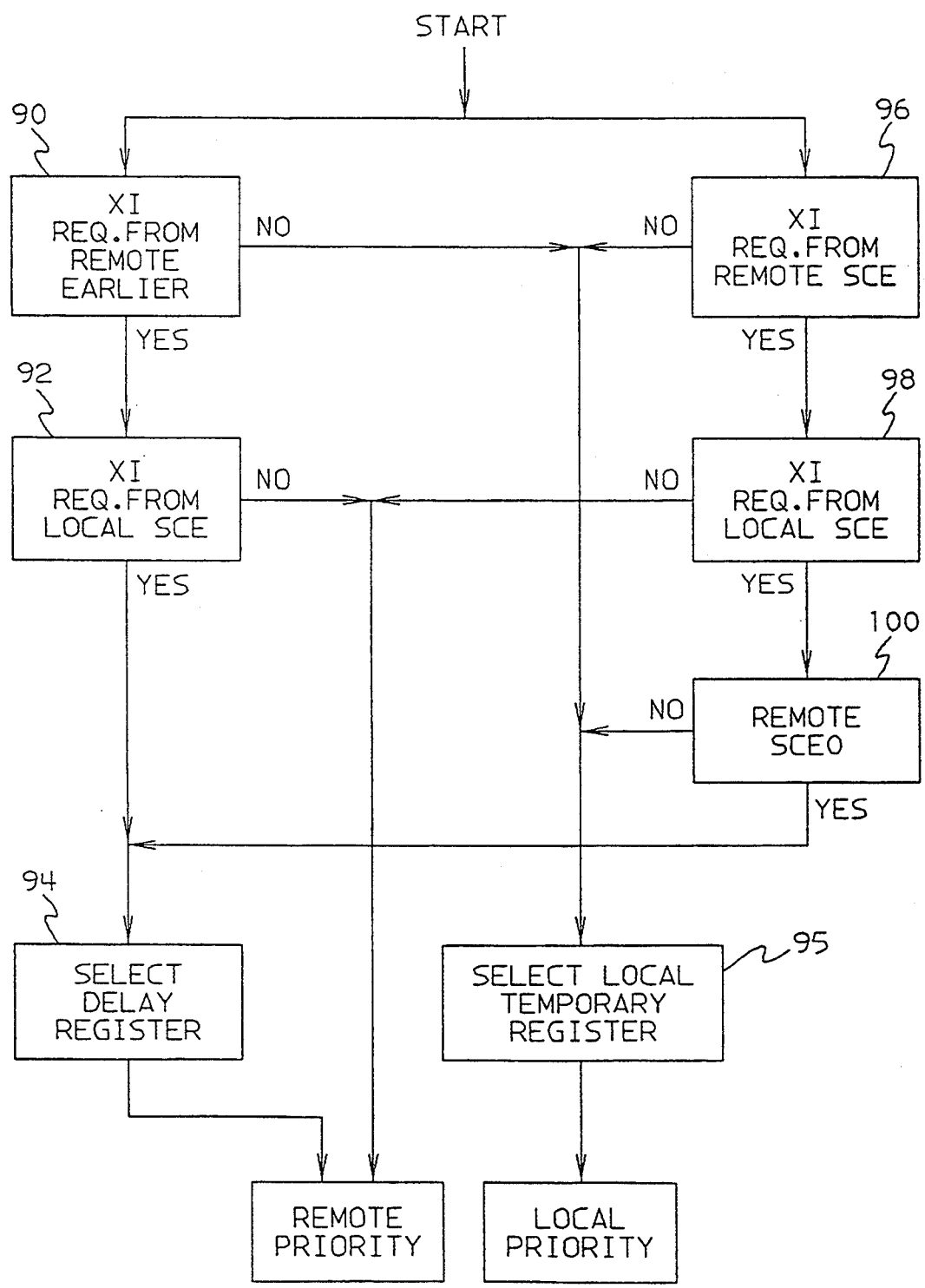
FIG. 5 is a flow chart illustrating the logic of the cross interrogate synchronization logic of the invention.

The operation of the control logic 89 for the cross interrogate synchronization mechanism is illustrated by the flow diagram shown in FIG. 5. This flow diagram illustrates the logic required when the XI request from the remote SCE is delayed one machine cycle. The logic detects in decision block 90 whether a request is received from the remote SCE one cycle earlier. In the case of the SCE1 84 shown in FIG. 3, the logical monitors temporary register 85 since this is the register that latches a remote SCE XI request. If a request is received from the remote SCE one cycle earlier, the logic then checks in decision block 92 whether a local XI request has been received. In the case of the SCE1 84 shown in FIG. 3, the logic monitors temporary register 86, this being the register than latches the local XI request. If the conditions of decision blocks 90 and 92 are met, then the content of delay register 87 is selected in block 94, thereby effectively giving priority to the remote XI request.

The other condition for selecting the delay register 87 is met by the other branch of the flow diagram of FIG. 5. The logic checks in decision block 96 to determine if a remote XI request has been received, and if so, the logic then checks in decision block 98 to determine if a local XI request has been received. If both conditions of decision blocks 96 and 98 are met, there is a conflict for which priority must be resolved. Therefore, a further test is made in decision block 100 to determine if the remote XI request is from the master SCE0, and if so, the contrast of the delay register 87 is selected instead of the temporary register 86, again effectively giving priority to the remote request from SCE0 81. If not from the master SCE, then priority is resolved in favor of the local XI request in block 95.

Returning to FIG. 3, the XI control logic 89 also controls the cross-interrogate priority logic 101. This logic selects either the output of the selector 88 or the content of the remote temporary register 85. Except for the two conditions illustrated by the logic in FIG. 4, the priority logic 101 normally selects the output of selector 88 which, in turn, selects the content of the local temporary register 86.

Figure 4:
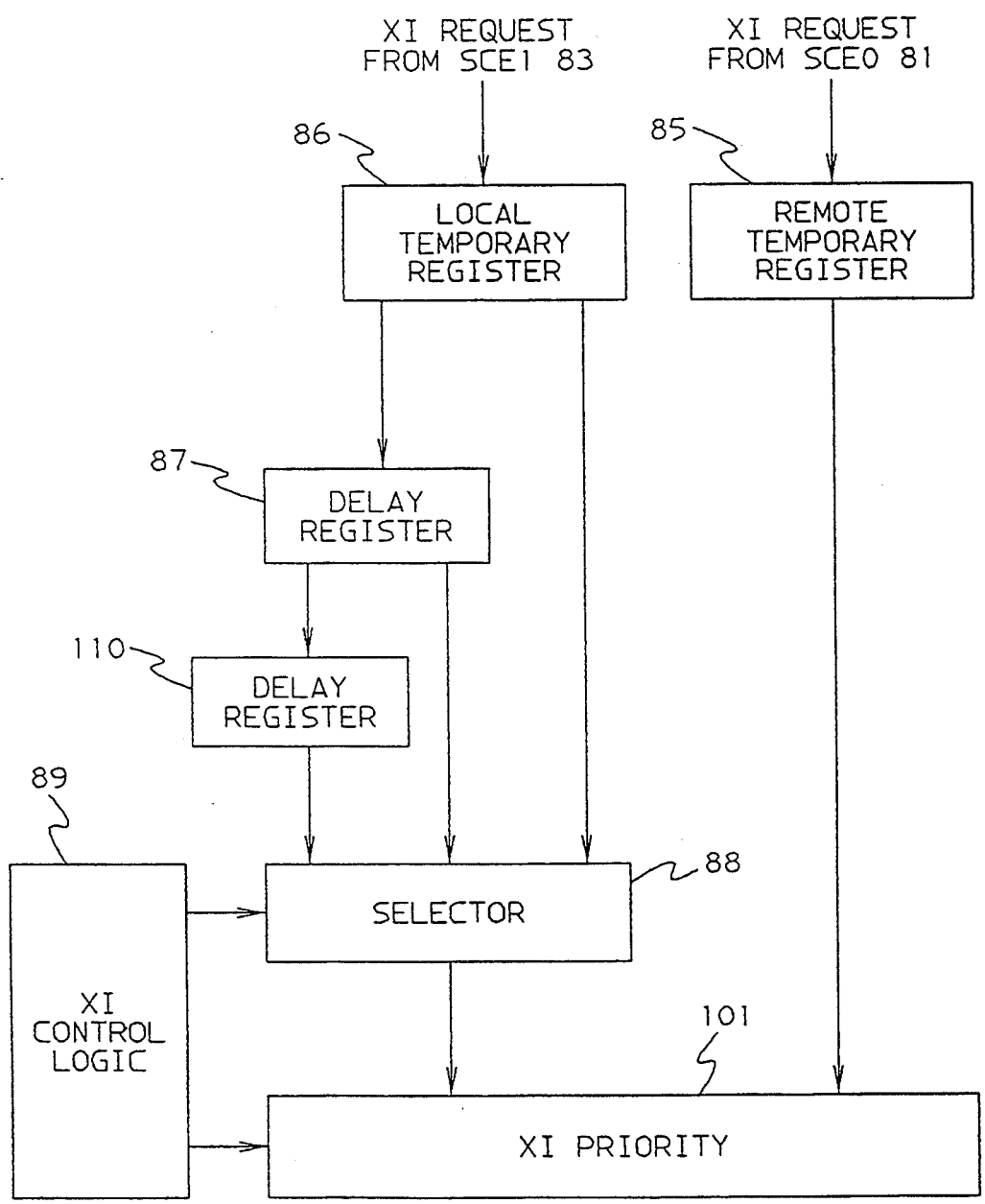
FIG. 4 is a block diagram of the cross interrogate synchronization logic which can accommodate remote XI requests which have been delayed two machine cycles.

While FIGS. 3 and 5 have shown the logic and flow of an embodiment of the present invention where remote XI requests are delayed for one machine cycle, FIG. 4 illustrates the logic required when remote XI requests are delayed for two machine cycles. As stated previously, requests from the remote SCE are effectively stored in the cable for some period of time, in the present illustration for two machine cycles. In order to achieve temporal synchronization, local requests must be staged in delay registers for up to two machine cycles. This is the purpose of the additional delay register 110 in FIG. 4.

For each aditional machine cycle delay caused by the cable lengths 74 and 76, an additional delay register will have to be added into the logic of FIG. 4. Each delay register will then cascade its contents into the successive delay register until the local XI request is selected for processing. The flow diagram shown in FIG. 5 is essentially the same for the case of a two machine cycle delay,. The only additional step will be to delay every local XI request at least one machine cycle to ensure synchronization.

Cycle simulation was done with the cross interrogate (XI) synchronization logic of the present invention scanned off and then on. A performance improvement was noted with the logic scanned on. The XI synchronism mechanism of the invention more efficiently prioritizes cross interrogate requests and, therefore, XI requests are completed sooner.

While the invention has been described in terms of two preferred embodiments, those skilled in the art will recognize that the invention can be practiced with modification within the spirit and scope of the appended claims. For example, the preferred embodiment contemplates but two SCEs, but more than two SCEs may be incorporated into a system, depending on the size and other requirements of the multi-processor system. In such a system, separate temporary registers 85 are provided for each remote SCE. Additionally, the delay by cables 74 and 76 may be more than one or two machine cycles, in which case a plurality of delay registers 87 are cascaded according to the delay.

Having thus described our invention, what we claim as new and desire to secure by Letters Patent is as follows:

1. A method for prioritization of cross interrogate requests in a multi-processor system, said multi-processor system containing a plurality of storage control elements interconnected by a communication link over which a cross interrogate request is delayed by at least one machine cycle, each storage control element of said plurality of storage control elements containing a local register, at least one remote register and at least one delay register, said method comprising:

latching local and remote cross interrogate requests in said local and remote registers, respectively;

latching contents of said local register into said delay register;

selecting contents of said local register when said remote register is empty; and selecting contents of said remote register and then contents of said delay register when a remote request is issued at least one machine cycle prior to a local request, thereby giving priority to said remote request, said step of selecting contents of said remote register and then contents of said delay register including determining when to bypass contents of said delay register and when to use contents of said delay register, and wherein all of said cross interrogate requests are prioritized in said multi-processor system.

2. The method for prioritization of cross interrogate requests recited in claim 1 wherein one of said storage control elements is designated as a master storage control element, said method further comprising:

detecting the latching of local and remote cross interrogate requests in said local and remote registers during a same machine cycle; and selecting contents of said remote register and then contents from said delay register when the remote cross interrogate request is from said master storage control element, thereby giving priority to said remote request.

3. The method for prioritization of cross interrogate requests recited in claim 1 wherein at least one of said remote cross interrogate requests is delayed by more than one machine cycle, said storage control element receiving said at least one of said remote cross interrogate requests having a plurality of cascaded delay registers corresponding to a number of machine cycles by which said at least one of said remote cross interrogate requests is delayed, said method further comprising:

cascading contents of each delay register into a subsequent delay register; and outputing contents of a last one of said plurality of cascaded delay registers for selection to stage a local request by an integral number corresponding to a number of machine cycles between issuance and receipt of said at least one of said remote requests.

4. An apparatus for prioritization of cross interrogate requests in a multi-processor system, said multi-processor system containing a plurality of storage control elements interconnected by a communication link over which a cross interrogate request is delayed by at least one machine cycle, said apparatus comprising:

a local register, at least one remote register and at least one delay register within each storage control element of said plurality of storage control elements;

means, operatively coupled to said local register and said at least one remote register, for latching local and remote cross interrogate requests in said local and remote registers, respectively;

means, operatively coupled to said local register and said delay register, for latching contents of said local register into said delay register;

logic means, operatively coupled to said local register and said remote register, for selecting contents of said local register when said remote register is empty and for selecting contents of said remote register and the contents of said delay register when a remote request is issued at least one machine cycle prior to the local request, thereby giving priority to said remote request, said logic means including means for determining when to bypass contents of said delay register when to use contents of said delay register, thereby selectively employing said delay register, and wherein all of said cross interrogate requests are prioritized in said multi-processor system.

5. The apparatus for prioritization of cross interrogate requests in a multi-processor system recited in claim 4 wherein one of said storage control elements is designated as a master storage control element, said apparatus further comprising:

means, operatively coupled to said local register and to said at least one remote register, for detecting the latching of local and remote cross interrogate requests in said local and remote registers during a same machine cycle; and logic means, operatively coupled to said remote register, said delay register and said master storage control element, for selecting contents of said remote register and then from said delay register when the remote cross interrogate request is from said master storage control element, thereby giving priority to said remote request.

6. The apparatus for prioritization of cross interrogate requests in a multi-processor system recited in claim 4 wherein at least one of said remote cross interrogate requests is delayed by more than one machine cycle, said storage control element receiving said at least one of said remote cross interrogate requests having a plurality of cascaded delay registers corresponding to a number of machine cycles by which said at least one of said remote cross interrogate requests is delayed, contents of each delay register being cascaded into a subsequent delay register, and contents of at last one of said plurality of cascaded delay registers being output for selection to stage a local request by an integral number corresponding to a number of machine cycles between issuance and receipt of said at least one of said remote requests.

* * * * *